United States Patent Office 3,349,052
Patented Oct. 24, 1967

3,349,052
THERMOPLASTIC FIBERS AND METHOD
OF PREPARING SAME
Ralph Zaayenga, West Chester, and Francis B. Bartholf, Boothwyn, Pa., assignors to Sun Oil Company, Philadelphia, Pa., a corporation of New Jersey
No Drawing. Filed Mar. 3, 1965, Ser. No. 436,936
13 Claims. (Cl. 260—28.5)

ABSTRACT OF THE DISCLOSURE

Thermoplastic wax-polyethylene fibers are formed by cooling a blend of 25–65% hydrocarbon wax and 35–75% polyethylene from above the softening point of the blend to below the softening point with simultaneous mixing. The density of the polyethylene should be at least 0.925.

---

This invention relates to a new type of thermoplastic fibers and to a method of preparing same. The novel fibers contain polyethylene and wax and are useful as insulation material, carton filler, and the like.

The term fiber is used herein in its normal meaning. It refers to a piece whose length is large compared to its width, i.e., average width. Normally the length:width ratio is at least 25:1 and is usually at least 50:1. The term fiber does not necessarily means an extremely long piece. It can be relatively short so long as its length is large compared to its width. The novel fibers of our invention have lengths of about ⅛ to about 2½ inches, usually ¼ to 1½ inches and have a length:width ratio of at least 25:1, usually at least 50:1.

Our novel fibers are prepared by a procedure which involves heating a homogeneous blend of polyethylene having a certain critical characteristic and wax to above the softening point of the blend and then cooling the blend to below its softening point, i.e., solidifying the blend, while simultaneously agitating, i.e., mixing, the blend. We have found that the form of the solid wax-polyethylene blend which results from solidifying the blend while simultaneously mixing same depends upon and is determined by the density of the polyethylene. If the density is below 0.925 (ASTM D1505–57T—all densities herein are in gms./cc.) the solid wax-polyethylene blend is merely a fine powder; no fibers are formed. If the density is above 0.925 and below about 0.950 the blend solidifies in the form of discrete fibers having the size characteristics described above. If the density is above about 0.950 the blend solidifies in the form of discrete lumps each of which has about the shape and smoothness of an oyster. These lumps are actually a very large number of fibers compacted together, the fibers having the size characteristics described above. These lumps can be readily disintegrated into separate, i.e., discrete, fibers by, e.g., impacting the lumps against a screen at a relatively high speed.

The first step of the method of our invention involves forming a homogeneous blend of polyethylene and wax at a temperature above the softening point of the blend. This is most conveniently accomplished by charging the polyethylene, usually in powder or pellet form, to a suitable mixer, e.g., a sigma blade mixer, equipped with heating means. The polyethylene is heated to above its softening point, usually 175°–275° F., and after it softens solid or liquid wax is charged to the mixer. The mass is then mixed until it is homogeneous. Alternately, solid wax and solid polyethylene can be charged to the mixer at room temperature and the mixture then heated to above the softening point of the polymer. This procedure is operable but less desirable because the wax melts very rapidly and the polymer then receives none of the kneading action of the mixer blades. Rather, the polymer merely sloshes around in the liquid wax. The net result is that although a homogeneous blend will eventually be obtained an unduly long time is required.

The polyethylene will, as stated above, have a density of at least 0.925. As mentioned above discrete fibers are formed directly upon cooling if the density is between 0.925 and about 0.950, whereas an after-grinding step, i.e., a disintegration step, is required if the density is above about 0.950. In the former case the density is preferably 0.930–0.945, whereas in the latter case the density is preferably greater than 0.955. Polyethylenes having densities ranging from 0.925 up to about 0.970 are widely available commercially and can be prepared by known methods. In these known methods a major factor in controlling the polyethylene density is the catalyst system employed. Densities up to about 0.930 can be obtained with a peroxide catalyst system whereas use of a chromium oxide catalyst as described in U.S. Patent 2,882,246 yields ethylene polymers having densities in the range of 0.92–0.97. The Ziegler type catalyst, i.e., an aluminum alkyl in combination with a titanium halide, usually yields polymers having densities above 0.940.

The polyethylene molecular weight is not critical for the present purpose. However, the conventional plastics grade polymer, which normally has a molecular weight of 15,000–100,000 (by solution viscosity), preferably 20,000–80,000, is preferred since this type results in fibers of maximum strength. If desired, however, polyethylenes having molecular weights up to 500,000 or even 1–2 million can be used. Melt index is actually a more meaningful physical property of plastics grade polyethylene than is molecular weight. Polyethylenes suitable for the present purpose will generally have a melt index (ASTM D1238–57T) of 0.1–200, usually 0.1–100.

The amount of polyethylene in the wax-polyethylene blend should be 35–75%, preferably 40–65%. The amounts of wax corresponding to these amounts of polymer are, of course, 25–65%, preferably 35–60%. More preferably, the amount of both wax and polyethylene is about 50%. All percentages and parts herein are by weight.

The wax should be a hydrocarbon wax with the petroleum waxes, i.e., paraffin wax or microcrystalline wax, being preferred. Either of these latter waxes can be obtained by known techniques. Paraffin waxes normally have melting points in the range of 100°–165° F. (ASTM D87–57), penetrations in the range of 5–25 dmm. (ASTM D1321–61T, 100 g., 5 sec.), and viscosities in the range of 30–50 S.U.S. (ASTM D446–53). The melting points, penetrations, and viscosities of the microcrystalline waxes are normally 140°–210° F. (ASTM D127–60), 5–25 dmm. (ASTM D1321–61T, 100 g., 5 sec.), and 60–100 S.U.S. (ASTM D446–53) respectively. The microcrystalline waxes are preferred because they are normally higher melting than the paraffins; hence there is less tendency for the fibers to stick together, either in the preparation or use of same. If desired, other hydrocarbon waxes, e.g., Fischer-Tropsch waxes, can be employed if desired.

The second step in the method of the invention is to cool the homogeneous wax-polyethylene blend to below its softening point while simultaneously mixing same. In other words the blend is mixed while being allowed to solidify. Since the wax-polyethylene blends employed in the invention are semi-solid and very viscous above their softening points, the only type of mixers that are effective to agitate or mix same are those which knead the blend such as the conventional dough kneaders and sigma blade mixers. Since the blends are not liquid even when above their softening points propeller and similar type agitators are not suitable.

As mentioned above, solidification of the wax-polyethylene blend with mixing results in two types of products depending upon the polyethylene density. When the density is 0.925 to about 0.950 discrete fibers are obtained directly upon solidification. In other words as the blend is cooled below its softening point, which is usually in the range of 150°–275° F. (ASTM D1525–58T), it is converted to a very large number of discrete fibers. It should be noted, however, that since the fibers are formed immediately upon solidification, i.e., since they are formed at the softening point, the initial temperature of the fibers is that of the softening point, hence the fibers are initially slightly sticky and as a result they exhibit a slight tendency to stick together. Further cooling to about 25°–50° F. below the softening point, preferably to below 100° F., completely eliminates this stickiness and makes the fibers completely free flowing. Mixing during this further cooling step is not required in order to form the fibers since the latter have already been formed but is desirable nonetheless in order to break up any agglomerates, i.e., fibers which have stuck together. In other words, continued mixing improves the free-flowing character of the fibers ultimately recovered.

If the polyethylene density is above about 0.950 the blend solidifies in the form of a plurality of discrete lumps. Each lump is in fact a plurality of fibers compacted together, the fibers having the same characteristics as the fibers obtained with the lower density polyethylene. Thus so long as the polymer density is above 0.925 fibers are obtained by cooling the blend to below the softening point with mixing. For densities of 0.925 to about 0.950 discrete fibers are obtained whereas for densities above about 0.950 the fibers are compacted together to form a plurality of lumps. In the latter case discrete fibers are obtained by breaking up the lumps.

The lumps obtained with polyethylene densities above about 0.950 also tend to be somewhat sticky near their softening point. Preferably they are further cooled to 25°–50° F. below their softening point, more preferably to below 100° F., to eliminate this stickiness.

The lumps can be disintegrated into discrete fibers in any convenient manner. Any conventional device for breaking up large pieces is suitable, for example, a ball mill, Waring Blender, etc. The preferred procedure involves the use of a device known commercially as an Entolleter. In this type of device the lumps to be subdivided are thrown at a high rate of speed by means of air against a screen or other gridwork of appropriate mesh size. Lumps broken up sufficiently small, i.e., discrete fibers, pass through the screen whereas over-size material is recycled and again thrown against the screen.

The invention is specifically illustrated by the following examples.

EXAMPLE 1

50 parts of a pelleted polyethylene having a density of 0.940, a melt index of 4, and being known commercially as Dylan 4042 is charged to a steam jacketed sigma blade mixer of 3 gallon capacity. The polyethylene (S.P.=about 220° F.) is steam heated, with the mixer blades turing, to 275° F. at which temperature the pellets are fused into a single semisolid mass. Next 50 parts of a paraffin wax having a melting point of 130° F. are charged to the mixer. The wax-polyethylene mixture is mixed at about 275° F. for about 30 minutes after which time the blend is homogeneous. Such a blend has a softening point of about 175° F. Next the steam is shut off and the contents of the mixer are allowed to slowly cool to room temperature with the blades running throughout the cooling period. When the mixture passes the softening point it solidifies as a multitude of small discrete fibers which exhibit some tendency to stick together. If one of the fibers is removed and held in the fingers it feels hot and slightly sticky. After the fibers have cooled to about 25° F. below the softening point they are substantially more free-flowing and at room temperature there is no tendency of the fibers to stick together. The fibers are next removed from the mixer for size determination. They range in length from about ⅛″ to 2½″ with most fibers being between about ¼″ to 1½″. The ratio of the length to the average width of each fiber varies from about 25:1 to 150:1 with most being between 50:1 and 100:1.

EXAMPLE 2

The procedure is the same as in Example 1 except for the type of polyethylene used. In this example the polyethylene has a density of 0.930, a melt index of 20, and is known commercially as Dylan 3202. The results are essentially the same as in Example 1.

EXAMPLE 3

The procedure is the same as in Example 1 except that the polyethylene has a density of 0.915, a melt index of 2, a softening point of about 200° F. and is known commercially as Dylan 1020. The results are as follows: The homogeneous wax-polyethylene blend solidifies at its softening point (about 160° F.) as a powder. In fact, the blend looks essentially the same as the many commercially available powdered polyethylenes. As the blend cools to room temperature there is no change in its appearance, i.e., it remains a powder.

EXAMPLE 4

The procedure is the same as in Example 1 except that the polyethylene has a density of 0.960, a melt index of 0.9, and is known commercially as Marlex 6009. The results are as follows: The wax-polyethylene blend solidifies at about 200° F. in the form of lumps about the size of oysters. Immediately upon formation one of the lumps is removed from the mixer and examined. It is found to be slightly sticky but after cooling to room temperature there is no sticky feeling whatsoever.

Several of the lumps are broken up by hitting them with a hammer. Each one is found to be a plurality of fibers essentially the same as obtained in Example 1 compacted together.

Another portion of the lumps is placed in a Waring Blendor. After minute or so they are disintegrated into discrete fibers.

Another portion of the lumps are placed on a strong wire screen and rolled around thereon hard with the palm of the hand. This also effects disintegration of the lumps with the resulting discrete fibers falling through the screen.

EXAMPLE 5

The procedure is the same as in Example 2 except that the amount of polyethylene is 40 parts and the amount of wax is 60 parts. The results are the same as in Example 2.

EXAMPLE 6

The procedure is the same as in Example 2 except that the amount of polyethylene is 25 parts and the amount of wax is 75 parts. The results are the same as in Example 3, i.e., the blend solidifies as a powder. No fibers are formed.

The invention claimed is:

1. Method of forming thermoplastic fibers which comprises (1) heating a homogeneous blend of polyethylene and hydrocarbon wax to above the softening point of the blend, said blend containing 35–75% polyethylene and 25–65% wax, said polyethylene having a density of 0.925 to about 0.950, (2) cooling said blend to below its softening point while simultaneously mixing same, whereby said homogeneous blend solidifies as a plurality of small discrete fibers, and (3) recovering said fibers.

2. Method according to claim 1 wherein the blend is cooled to at least 50° F. below its softening point.

3. Method according to claim 2 wherein said wax is paraffin wax, said density is 0.930–0.945, the molecular weight of said polyethylene is 15,000–500,000, and the melt index of said polyethylene is 0.1–200.

4. Method according to claim 2 wherein the amount of polyethylene is 40–65% and the amount of wax is 35–60%.

5. Method according to claim 1 wherein the amount of polyethylene is about 50% and the amount of wax is about 50%.

6. Method of forming thermoplastic fibers which comprises (1) heating a homogeneous blend of polyethylene and hydrocarbon wax to above the softening point of the blend, said blend containing 35–75% polyethylene and 25–65% wax, said polyethylene having a density greater than about 0.950, (2) cooling said blend to below its softening point while simultaneously mixing same, whereby said homogeneous blend solidifies as a plurality of small lumps, each lump being a plurality of small fibers compacted together, and (3) disintegrating said lumps into said small fibers.

7. Method according to claim 6 wherein the blend is cooled to at least 50° F. below its softening point.

8. Method according to claim 7 wherein said wax is paraffin wax, said density is greater than 0.955, the molecular weight of said polyethylene is 15,000–500,000, and the melt index of said polyethylene is 0.1–200.

9. Method according to claim 6 wherein the amount of polyethylene is 40–65% and the amount of wax is 35–60%.

10. Method according to claim 6 wherein the amount of polyethylene is about 50% and the amount of wax is about 50%.

11. As a new thermoplastic fiber composition a blend containing 35–75% polyethylene having a density greater than 0.925 and 25–65% hydrocarbon wax, said blend being in the form of a plurality of small pieces, each of which has a length:width ratio of at least 25:1.

12. Composition according to claim 11 wherein the amount of polyethylene is 40–65% and the amount of wax is 35–60%.

13. Composition according to claim 11 wherein the length:width ratio is at least 50:1.

References Cited
UNITED STATES PATENTS

| | | | |
|---|---|---|---|
| 3,105,823 | 10/1963 | Boenau | 260—28.5 |
| 3,230,191 | 1/1966 | Roedel | 260—28.5 |

ROBERT F. WHITE, *Primary Examiner.*

J. R. HALL, *Assistant Examiner.*